(12) United States Patent
Voss

(10) Patent No.: US 6,454,689 B1
(45) Date of Patent: Sep. 24, 2002

(54) PROCESS AND DEVICE FOR THE ALIGNMENT OF TWO WEBS THAT ARE JOINED TOGETHER TO FORM A MULTILAYERED WEB

(75) Inventor: Hans-Ludwig Voss, Tecklenburg (DE)

(73) Assignee: Windmoller & Holscher, Lengerich (DE)

( * ) Notice: Subject to any disclaimer, the term of this patent is extended or adjusted under 35 U.S.C. 154(b) by 0 days.

(21) Appl. No.: 09/244,980

(22) Filed: Feb. 4, 1999

(30) Foreign Application Priority Data

Feb. 6, 1998 (DE) .......................................... 198 04 735

(51) Int. Cl.⁷ ................................................ B31B 1/00
(52) U.S. Cl. .......................................... 493/11; 493/297
(58) Field of Search ........................... 493/11, 297, 298, 493/374, 379

(56) References Cited

U.S. PATENT DOCUMENTS 5,818,719 A * 10/1998 Brandon et al.
5,908,169 A * 6/1999 Brinkmeier
5,930,139 A * 7/1999 Chapdelaine et al.
6,062,751 A * 5/2000 Baum

FOREIGN PATENT DOCUMENTS

| DE | 33 04 657 | 9/1984 |
| DE | 41 14 255 | 4/1992 |
| DE | 42 25 061 | 3/1993 |

* cited by examiner

Primary Examiner—Eugene Kim
(74) Attorney, Agent, or Firm—Jacobson Holman, PLLC

(57) ABSTRACT

A system and method for aligning two webs which are pulled off respective supply rolls, at least one of which is elastic in nature, the two webs being joined into a multilayered web. The system includes a first deflecting roller for depositing the elastic web on the second web, and second and third deflecting rollers located between the elastic web supply roll and the first deflecting roller. A traversing roller is located between the second and third deflecting rollers so as to form a loop therewith, a position of the traversing roller being adjustable relative to the second and third deflecting rollers for changing the tension on the elastic web. An alignment between marks on the elastic web and markings on the second web is monitored and, when there is a misalignment, an actuating drive coupled to the traversing roller adjusts the position of the traversing roller in order to change the tension on the elastic web and thereby align the marks and the markings as the webs are joined.

5 Claims, 1 Drawing Sheet

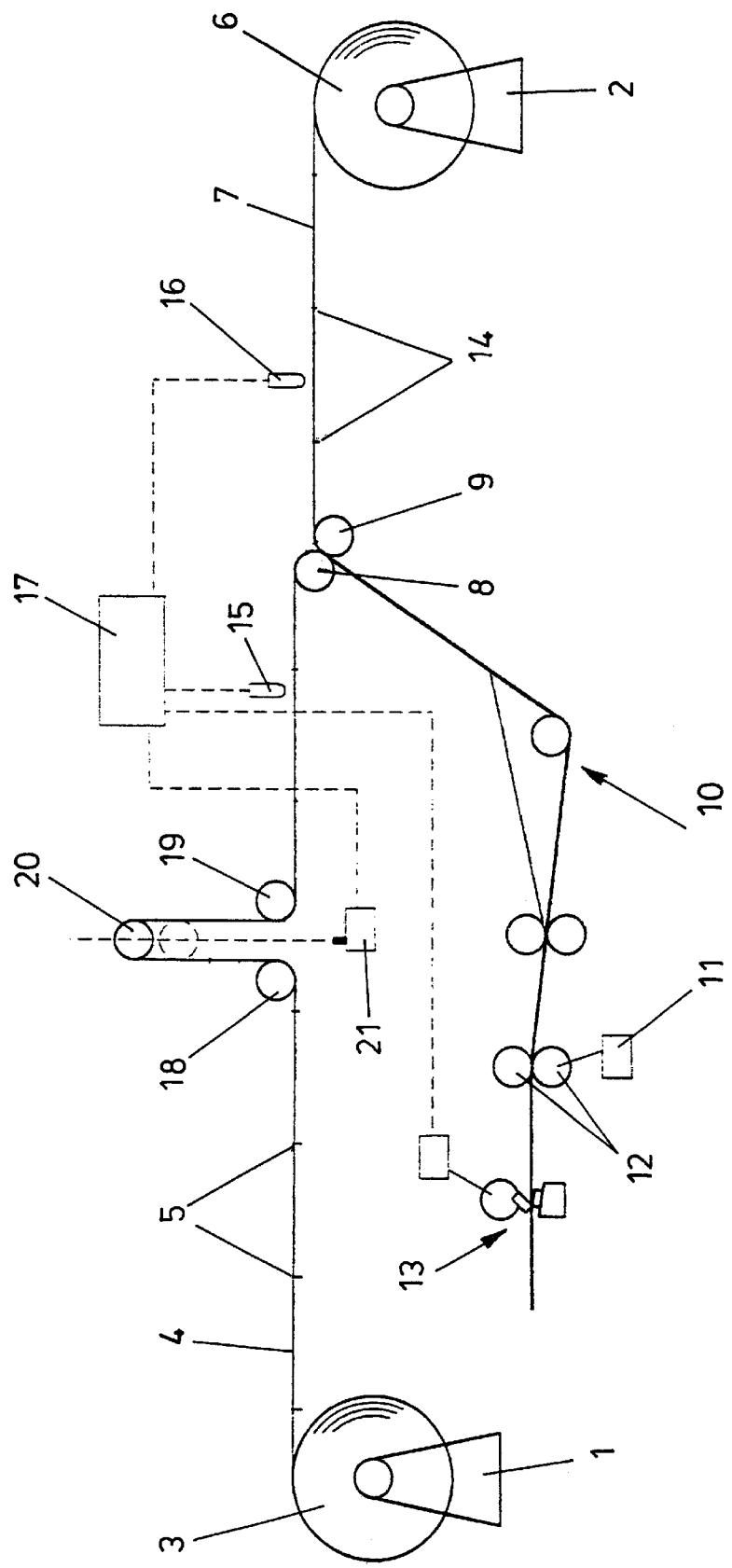

PROCESS AND DEVICE FOR THE ALIGNMENT OF TWO WEBS THAT ARE JOINED TOGETHER TO FORM A MULTILAYERED WEB

BACKGROUND OF THE INVENTION

1. Field of the Invention

The invention relates to a process for the alignment of two webs that are joined together to form a multilayered web and of which preferably at least one web is made of plastic film, and a device to carry out this process.

2. Description of the Related Art

In the production of multilayered webs there is often the need to position them correctly so that marks, markings or printed images, affixed on the webs, are in the correct alignment. Even if the joined webs were adjusted during production with respect to their length or the distance between printed images, marks or markings, the length of the webs can change due to external influences so that, after the webs are joined together, they are no longer in correct alignment with respect to each other.

SUMMARY OF THE INVENTION

Therefore, the object of the invention is to provide a process to align two single or multilayered webs so that the webs can be joined together in the correct position, even if the marks, markings, or printed images, affixed on the webs, no longer match correctly in their spacing.

The invention solves this problem in that one web, optionally the plastic web, is held under stress, which elongates elasticly said web, and the tension is increased or decreased in accordance with the deviation of the scanned printed marks or markings from the desired values.

The invention proceeds from the knowledge that webs and preferably plastic webs can be lengthened or shortened, when they are held under prestress and this prestress is increased in accordance with the desired elongation or decreased in accordance with the desired shortening. According to the process of the invention, two webs can be correctly positioned with respect to each other, whereby after their alignment the webs can also be connected, cemented or welded together.

In particular the production of single or multilayered paper sacks with an internal sack made of thermoplastic film presents the problem of joining together the webs, from which the sacks are made, in such a manner so as to be in the correct position that, for example, the position of the cross welds and/or the cross perforations of the internal sacks, made of a blown film, are in the correct position relative to the print on the paper sacks, encompassing these internal sacks.

The prints or printed marks, which are affixed on the paper web and must be in the correct position relative to the cross welds and/or the cross perforations of the plastic tubular web after the webs are joined together, can shift, and, to be precise, for example, as a function of the moisture of the paper web, fluctuations of the prints or printed marks and the hardness, with which the paper web was wound into a roll, from which the paper web is then drawn off prior to its union with the tubular plastic film web.

Therefore, according to an especially preferred embodiment of the invention, the process—which produces tubular paper lengths with inlaid internal sack made of thermoplastic film and in which process a tubular plastic film web, provided with cross welds, and a single or multilayered paper web are taken off of supply rolls and are joined together in such a manner that the paper web envelops the tubular plastic film web by folding in its sides so as to overlap each other during the tube forming process, and in which process the tubular lengths are severed from the tubular web, thus formed, by means of transverse severance cuts or tears along the cross perforation lines, —provides that, after being unrolled, the tubular plastic film web is held under stress; that printed marks or cross perforation lines of the paper web and cross welds, cross perforation lines or printed marks of the tubular plastic film web are scanned; and that such a tension is set or maintained in the tubular plastic film web that the positions of the scanned marks or markings of the webs are in the correct alignment with respect to each other. Thus, should the bottoms or bottom and head welds move, for example, away from the prints on the paper web during the production of the tubular lengths, which are processed into paper sacks with internal sacks made of plastic film in the next processing steps, the register can be reproduced by suitably increasing or decreasing the stress and by aligning and correctly positioning the resulting elongation or shortening of the tubular plastic film web with respect to the paper web.

A device to carry out the process according to the invention is characterized according to the invention in that between the unwinding unit for the tubular plastic film web and the roller, which deposits said web on the paper web, there are deflecting rollers, between which is arranged a roller, which is provided with a regulating drive and draws the tubular plastic film web into a loop; in that there are sensors, which scan the marks or markings of the tubular plastic film web and the paper web and whose signals are fed to a computer and control unit, which in accordance with the deviation of the marks or markings from the desired values controls the regulating drive for increasing or decreasing the stress of the tubular plastic film web.

A preferred embodiment of the invention provides that the tubular web, formed by folding in the sides of the paper web, is drawn by a driven pair of rollers out of the tube forming station; and the tubular lengths are severed from the tubular web by a cutter, which is controlled by a computer and control unit. Expediently the pair of rollers draws the tubular paper web with inlaid internal tube, which is made of plastic film and is provided with cross welds, at a constant rate from the tube forming station.

BRIEF DESCRIPTION OF THE DRAWINGS

One embodiment of the invention is explained in detail below with reference to the drawing, whose single FIGURE depicts as a schematic drawing a line for producing tubular paper lengths with inlaid internal tube made of a thermoplastic film.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

From the signals of the sensors 15, 16 or a comparison of these signals, the computer and control unit 17 determines whether the position of the marks or markings 5, 14 of the tubular plastic film web 4 and the paper web 7 are in correct alignment with each other and whether deviations exist. If deviations are determined, they are eliminated by increasing or decreasing the tension of the tubular plastic film web 4 by moving the traversing roller 20 in and out in such a manner that the marks or markings match precisely and are in correct alignment.

In the conventional type of frames 1, 2, which serve the unwinding process, there are mounted a roll 3 of a tubular thermoplastic film 4, over which cross welds and/or perforations are spaced uniformly, and a roll 6 of single or multilayered paper. The tubular plastic film web 4, made for example of PE, and the paper web 7 are drawn by the conventional method from the supply rolls 3, 6 by a pair of take-off rollers (not illustrated).

The paper web 7 and the tubular plastic film web 4 are joined together by traveling over deflecting rollers 8, 9. Then the paper web 7 and the tubular plastic film web, which is laid on said paper web, run through a tube forming station 10, where the sides of the paper web 7 are folded in so as to overlap and thus form a tubular web so that the paper web 7, made into a tube, envelops the inlaid tubular plastic film web. To attach the sides that folded in to form a tube, said sides are connected together in their overlapping region by a longitudinal adhesive seam.

The tubular web, formed in the tube forming station, is pulled out by pre-drawing rollers 12, provided with a drive 11, and then travels through a cross cutter 13, where tube lengths are severed from the tubular web and then the tube lengths are further processed into paper sacks with inlaid internal plastic sack.

The paper web 7 is provided with printed marks 14 at tubular length intervals.

The welds and/or cross perforations lines 5 of the tubular plastic film 4 are scanned by a sensor 15; and the printed marks 14 of the paper web 7, by a sensor 16. The signals of the sensors 15, 16, which can be reflection scanners, are sent to a computer and control unit 17.

The plastic film web 4 is held under prestress, which expands said web, by means of pre-drawing rollers. To change this prestress, the tubular plastic film web 4 travels over deflecting rollers 18, 19, between which said web is drawn out into a loop by means of a traversing roller 20. The traversing roller 20 is provided with a regulating drive 21, which is controlled by the computer and control unit 17 and moves the roller 20 in or out in order to increase or decrease the web tension.

From the signals of the sensors 15, 16 or a comparison of these signals, the computer and control unit 17 determines whether the position of the marks or markings 5, 14 of the tubular plastic film web 4 and the paper web 7 are in correct alignment with each other and whether deviations exist. If deviations are determined, they are eliminated by increasing or decreasing the tension of the tubular plastic film web 4 by moving the traversing roller 20 in and out in such a manner that the marks or markings match precisely and are in correct alignment.

After the webs have been joined together, the tubular plastic film web 4 can be attached by adhesive dabs on the paper web 7.

The computer and control unit 17 also controls the cross cutter 13, so that the transverse severance cuts are correctly positioned. After the transverse severance cuts have been made, the prestressed tubular plastic film web can be unstressed, i.e. allowed to contract, a feature that is innocuous to the subsequent production of sacks.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A device for aligning two webs which are pulled off respective supply rolls and joined into a multilayered web, comprising:

a first web pulled off a first supply roll and having marks thereon, said first web having an elasticity;

a second web pulled off a second supply roll and having markings thereon;

a first deflecting roller for depositing said first web on said second web;

second and third deflecting rollers, located between said first supply roll and said first deflecting roller;

a traversing roller, located between said second and third deflecting rollers so as to form a loop therewith, a position of said traversing roller being adjustable relative to said second and third deflecting rollers for stretching said first web;

an actuating drive coupled to said traversing roller for adjusting the position of said traversing roller in order to change a tension of said first web;

sensing elements for detecting said marks and said markings on said first web and said second web, respectively, said sensing elements including a first sensor located between said third deflecting roller and said first deflecting roller and at a distance from said first web;

a controller, coupled to said sensing elements and to said actuating drive, for determining a deviation between the marks and the markings and a desired value and, in response to said deviation, for controlling said actuating drive to change a tension on said first web by changing the position of said traversing roller, without changing said distance between said first sensor and said first web.

2. The device as set forth in claim 1, wherein said sensing elements include a second sensor located between said first deflecting roller and said second supply roll, said second web passing over a fourth deflecting roller located adjacent said first deflecting roller.

3. The device as set forth in claim 1, wherein said traversing roller is moved in and out by said actuating drive to decrease and increase, respectively, tension on said first web.

4. A device for aligning two webs which are pulled off respective supply rolls and joined into a multilayered web, comprising:

a plastic web pulled off a first supply roll and having marks thereon;

a second web pulled off a second supply roll and having markings thereon;

a first deflecting roller for depositing said plastic web on said second web;

second and third deflecting rollers, located between said first supply roll and said first deflecting roller;

a fourth deflecting roller, located adjacent said first deflecting roller, for directing said second web into contact with said plastic web;

a traversing roller, located between and substantially equidistant from each of said second and third deflecting rollers so as to form a loop therewith, a position of said traversing roller being adjustable relative to said second and third deflecting rollers for stretching said plastic web;

an actuating drive coupled to said traversing roller for adjusting the position of said traversing roller in order to change a tension of said plastic web;

a first sensor, located between said second and third deflecting rollers and said first deflecting roller, for scanning said marks on said plastic web, said first sensor located at a distance from said plastic web;

a second sensor, located between said fourth deflecting roller and said second supply roll, for scanning said markings on said second web; and a controller, coupled to said first and second sensors and to said actuating drive, for determining a deviation between the marks and the markings and a desired value and, in response to said deviation, for controlling said actuating drive to change a tension on said first web by changing the position of said traversing roller, without changing said distance between said first sensor and said plastic web.

5. The device as set forth in claim 4, wherein said traversing roller is moved in and out by said actuating drive to decrease and increase, respectively, tension on said plastic web to align said marks with said markings.

* * * * *